United States Patent

[11] 3,588,437

[72] Inventors Peter Dominic Prevett
Stoneham;
Theodore Joseph Morin, Needham, both of Mass.

[21] Appl. No. 782,914
[22] Filed Dec. 11, 1968
[45] Patented June 28, 1971
[73] Assignee Industrial Magnetics, Inc.
Canton, Mass.

[54] CONDUCTIVE SOLIDS WELDING CIRCUITRY
15 Claims, 4 Drawing Figs.

[52] U.S. Cl. .......... 219/113
[51] Int. Cl. .......... B23k 11/24
[50] Field of Search .......... 219/108, 113

[56] References Cited

UNITED STATES PATENTS 3,404,251 10/1968 Hubbard .......... 219/108
3,406,324 10/1968 Ayers .......... 219/113X

*Primary Examiner*—Bernard A. Gilheany
*Assistant Examiner*—Roy N. Envall, Jr.
*Attorney*—William W. Rymer, Jr.

ABSTRACT: Conductive solids are worked in heating and force application cycles under the control of circuitry including, in various aspects, circuitry for varying the heating rate during the heating cycle; circuitry for initiating capacitor charging after the initiation of the heating cycle but prior to termination of the heating cycle by a time interval not substantially greater than that required for capacitor charging; and steering circuitry for selective employment of first, second, and third subcycle control circuits.

CONDUCTIVE SOLIDS WELDING CIRCUITRY

This invention relates to working solid material (e.g., metal) in which currents can be induced by the steps of heating the material and then exposing it to forces produced by a high intensity magnetic field.

Objects of the invention are to improve uniformity of working throughout the material, to reduce working time while achieving the desired quality of working, and to improve control over heating and force application (e.g., by providing greater flexibility in determining heating rates and by reducing leakage from the capacitor bank employed in the force application step), all with reliable, simple, and inexpensive apparatus.

In one aspect the invention features the operation of a generator circuit to provide different heating rates during different portions of a heating cycle. In preferred embodiments the generator output is controlled by resistive elements which are variable and which are switched under the control of a timer so that the first heating portion occurs at a higher rate. In another aspect the invention features circuitry to delay the charging of the capacitor bank until a time subsequent to the initiation of the heating cycle but prior to the termination of the heating cycle by a time interval not substantially greater than that required to charge the capacitor bank. In preferred embodiments a pair of timers is employed for timing intervals which together span the heating cycle; first and second subcycle control circuits are provided, respectively including separate timers for timing intervals each shorter than the duration of the respective subcycle heating steps; the first and second subcycle control circuits share another timer; master control circuitry includes a voltage limiting element operative to determine charge in the capacitor bank; the capacitor bank is connected to the work element through a first switch having an actuator connected to one power supply terminal through a second switch and to another power supply terminal through a third switch, the generator circuit is connected to the work element through a fourth switch having an actuator connected to one of the power supply terminals through the third switch, the control circuitry being arranged to open the third switch at the beginning of the heating cycle, to close the third switch to initiate charging of the capacitor bank and close the second switch no later than the time at which the third switch is closed; an actuating element is provided for opening the second switch, and steering circuitry is provided for effectively connecting that actuating element to power supply terminals, the steering circuitry comprising first and second branches respectively associated with the first and second subcycle control circuits, each branch including a switch adapted to be closed only after the subcycle go switch associated with the respective branch has been actuated; the steering circuitry has a third branch effectively connecting the last mentioned actuator to the power supply terminals if neither of the first and second subcycle go switches is actuated, the second and third branches having in common a normally closed switch which opens upon actuation of the first subcycle go switch.

In another aspect the invention features first, second, and third subcycle control circuits; first, second and third subcycle go switches each actuatable prior to initiating of the first subcycle; and steering circuitry including a first branch connected between power supply terminals, the first branch including in series a normally closed first-relay controlled switch, a normally open second-relay controlled switch, and a step switch having first, second, and third contact sets in the first, second, and third subcycle control circuits respectively, and a fourth contact set; a second branch containing a step reset switch; a third branch containing the fourth contact set; and a fourth branch containing a normally open third-relay controlled switch; the second branch being connected at one end to one power supply terminal and at the other to one end of the third branch, the other end of the third branch being connected to the other power supply terminal; the fourth branch being connected at one end to the junction of the second and third branches and at the other end through the third contact set to said other terminal; the normally closed first-relay controlled switch being opened upon actuation of the first subcycle go switch but not upon actuation of the second or third subcycle go switches; the normally open second-relay controlled switch being closed upon the discharge of the capacitor bank; and the normally open third-relay controlled switch being closed upon actuation of the second subcycle go switch but not upon actuation of the third subcycle go switch.

Other objects, features, and advantages will appear from the following description of a preferred embodiment of the invention, taken together with the attached drawings thereof, in which.

Figure 1:
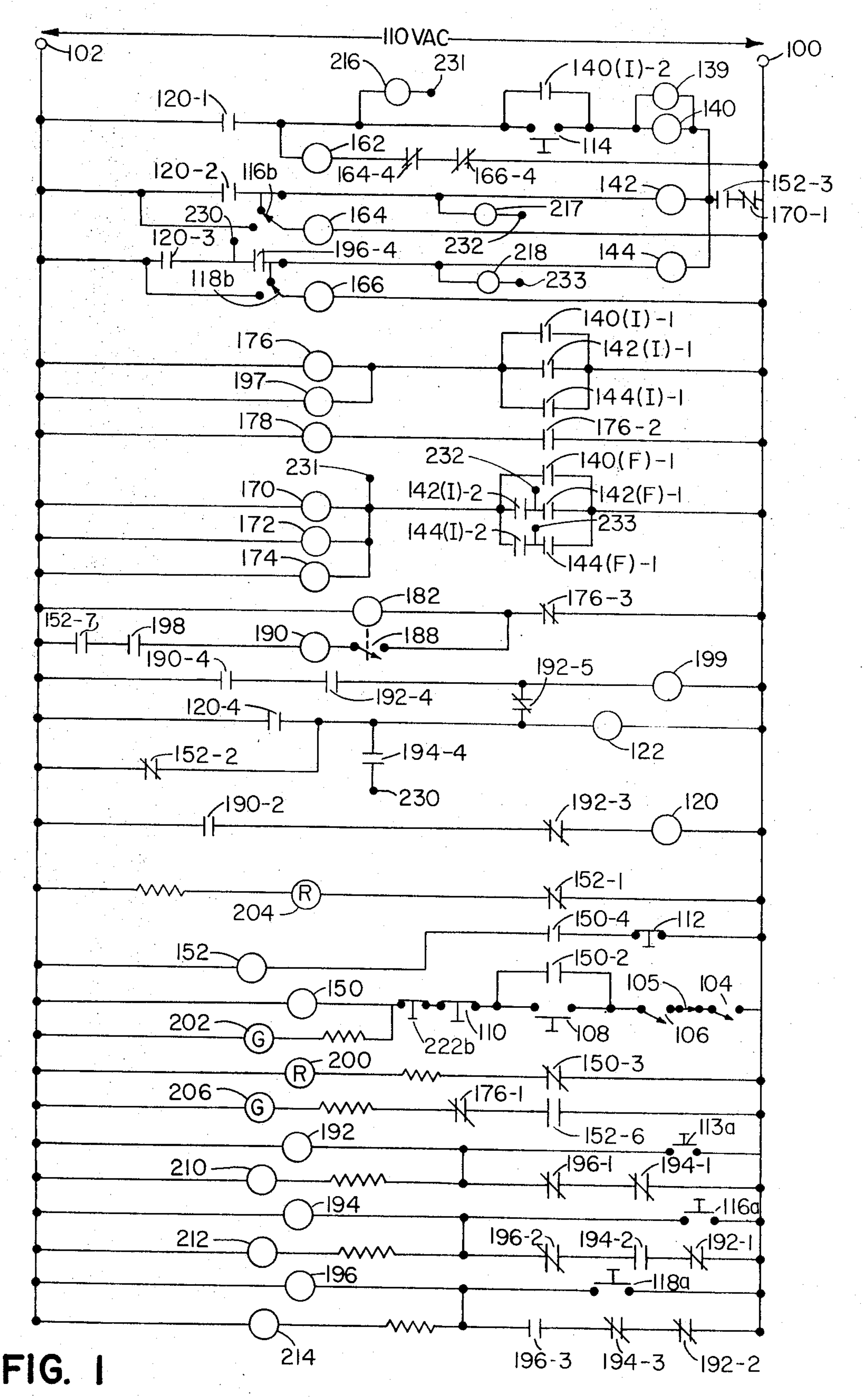
FIG. 1 is a circuit diagram of the master control circuit of the preferred embodiment of the invention.

Referring first to the capacitor charge circuit (FIG. 2), there are shown terminals 10 and 12 for connection to a single phase 440-volt 60-hertz alternating current power source, a main switch 14, a 440/110 stepdown transformer 16, and a 440/4,200 stepup transformer assembly 18 connected to a high voltage bridge rectifier 20 (e.g. Semicon S8KV3A) which is connected to a circuit including a charging resistor bank 22 of four 3-kilohm, 200-watt resistors in parallel, a 5-kilohm dump resistor 24, and three parallel 136-microfarad 5-kilovolt capacitors forming a capacitor bank 26 connected to terminals 30 and 32 through parallel mercury pool ignitrons 34 (e.g. General Electric GL7703) having ignition terminals 36, 37, 38 and 40. A trigger circuit 42 is supplied by a 110-volt alternating current.

Referring next to the generator circuit (FIG. 3), there are shown a motor generator starter 50 connected to a three phase 440-volt power source not shown, a starter control circuit generally designated 52, a motor 54, connected to starter 50, directly connected to a 50-kilowatt, 10-kilohertz generator 56 wound to produce a 220/440-volt output. In the start control circuit there are shown an "on," normally open, pushbutton switch 220, an "off," normally closed, pushbutton switch **222*a*, which is mechanically linked to normally closed contacts 222*b*, shown in FIG. 1, a hold coil relay 224 controlling contacts 224–1, a red light 226 indicating when the starter is off, and a green light 228 indicating when the starter is on. A generator field coil 58 is shown connected to a voltage adjusting circuit 60. Circuit 60 includes via an appropriate resistor 61 a standard voltage regulated power supply 62 supplied with 110-volt alternating current which includes terminals 74 and 76 corresponding to terminals 74 and 76 on 440/220 stepdown transformer 80 whose primary is connected across the output of generator 56 to sense the output voltage. Circuit 60 further includes heat control field adjustment rheostats 77, 82, 84 and 86. Also shown, coupled to the generator output, are the standard metering elements, a meter bridge rectifier circuit, generally designated 79, an ammeter 81, a kilowatt meter 83, a resistance 85, a KVAR meter 87, and a voltmeter 89. Included in the output circuit of the generator are adjustable water-cooled 300 KVAR capacitors 88 for improving power factor. The load circuit is linked, by a transformer 92 with adjustable taps for anywhere from a 5/1 to 17/1 voltage stepdown, to a load circuit including a work coil 94 in which are generated the inductive heating and magnetic pulsing currents which act upon materials to be welded in the magnetic welding process. Work coil 94 has terminals 30 and 32 which are electrically connected to terminals 30 and 32** appearing in FIG. 2.

Referring to the capacitor control circuit (FIG. 4), terminals 128 and 129 are connected to a 110-volt, single-phase, 60-hertz, alternating current power source. A capacitor bank charge relay coil 160 is shown controlling the normally open contacts 160–1 and 160–2 shown in the capacitor charge circuit of FIG. 2. A vacuum switch driving circuit 115 is shown including a coil 117 which controls normally closed contacts 117–1 in the capacitor charging circuit of FIG. 2. Three capacitor bank voltage meter relay coils 130, 132 and 134 are shown. The voltmeter coils control normally closed contacts 130–1, 132–1 and 134–1 in the following way. When a voltmeter coil is energized it measures the voltage of the capacitor bank 26 by connection to nongrounded terminal 136 of the capacitor bank through a suitable resistor 138 (e.g. 100 megohm). When the voltage of the capacitor bank reaches an adjustable preset level, the normally closed contact controlled by the voltmeter coil is opened.

Figure 2:
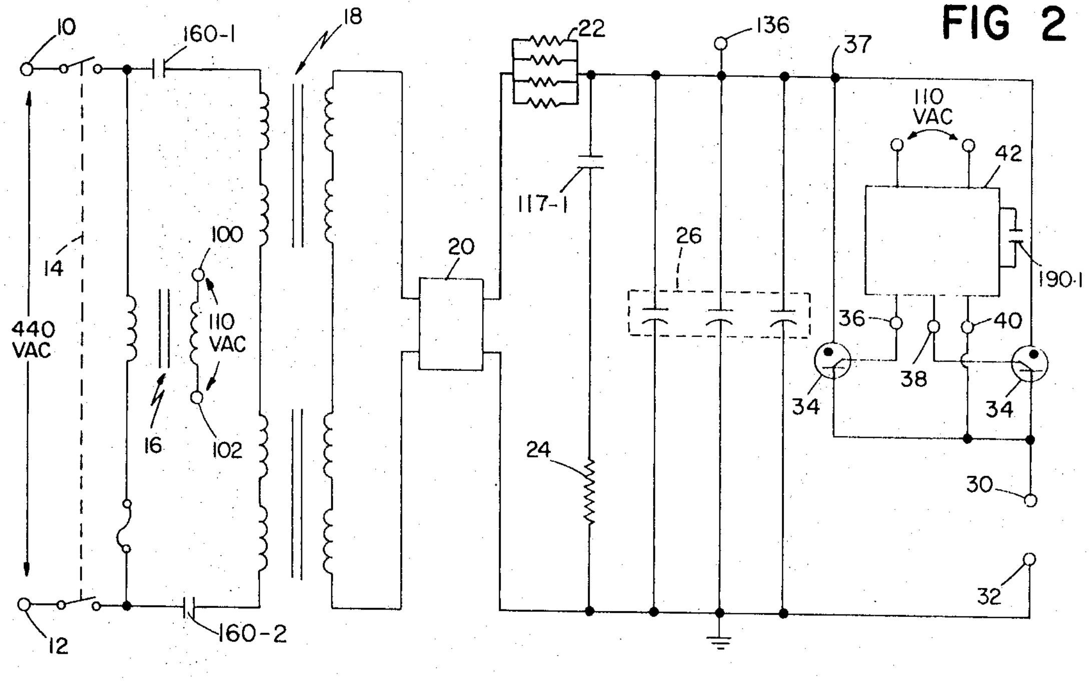
FIG. 2 is a circuit diagram of the capacitor circuit thereof.

Referring finally to the master control circuit (FIG. 1), terminals 100 and 102 are connected to the low voltage (110 volts) side of transformer 16 shown in FIG. 2. Various switches are shown. A pressure switch 104, generator overload switch 105, and door switch 106 are shown. A pushbutton, normally open, "field on" switch 108 and a pushbutton, normally closed, "field off" switch 110 are also shown. Other switches shown are an "abort" alternate on-off ratchet switch 112 and a pushbutton, normally open, "start" switch 114. "One mode," "two mode" and "three mode" pushbutton, normally open, switches 113*a*, 116*a*, and 118*a*, respectively, are also shown. Contacts 113*b*, 116*b*, and 118*b* are mechanically controlled by mode switches 113*a*, 116*a*, and 118*a*, respectively. Their normal positions are shown in FIG. 1 (except switch 113*b* shown in FIG. 3). A step switch 120 is shown which controls contacts 120–1, 120–2, 120–3, and 120–4, three of which are always open. The step switch closes successively the contacts it controls whenever it receives an energizing electrical pulse, and as any contact is closed the previous one is opened. If contacts 120–1 are closed and the step switch is energized, contacts 120–2 will close and contacts 120–1 will open. A step reset switch 122 is shown. When the step reset switch is energized the step switch reverts from whatever position it is in to the one in which contacts 120–1 are closed.

Control devices for the heating and pressure steps include three adjustable timer motor units 140, 142 and 144. Timer unit 140 controls normally open contacts 140(I)–1, 140(I)–2, and 140(F)–1. Timer unit 142 controls normally open contacts 142(I)–1, 142(I)–2, and 142(F)–1. Timer unit 144 controls normally open contacts 144(I)–1, 144(I)–2, and 144(F)–1. When timer unit 140 is energized initially, it closes contacts 140(I)–1 and 140(I)–2. When an adjustable preset time after energization is finally reached, contacts 140(F)–1 are also closed. This is true for timer 142 and contacts 142(I)–1 and 142(I)–2, and contacts 142(F)–1, respectively, as well as for timer 144 and contacts 144(I)–1 and 144(I)–2, and 144(F)–1, respectively. Adjustable time delay unit 139, in parallel with timer unit 140, controls normally open contacts 139–1 and 139–2, and normally closed contacts 139–3 and 139–4 (shown in FIG. 3), operating them when the preset time is attained. An adjustable capacitor charge timer 170 controls contacts 170–1 by opening the contacts a preset time after being initially energized.

Figure 3:
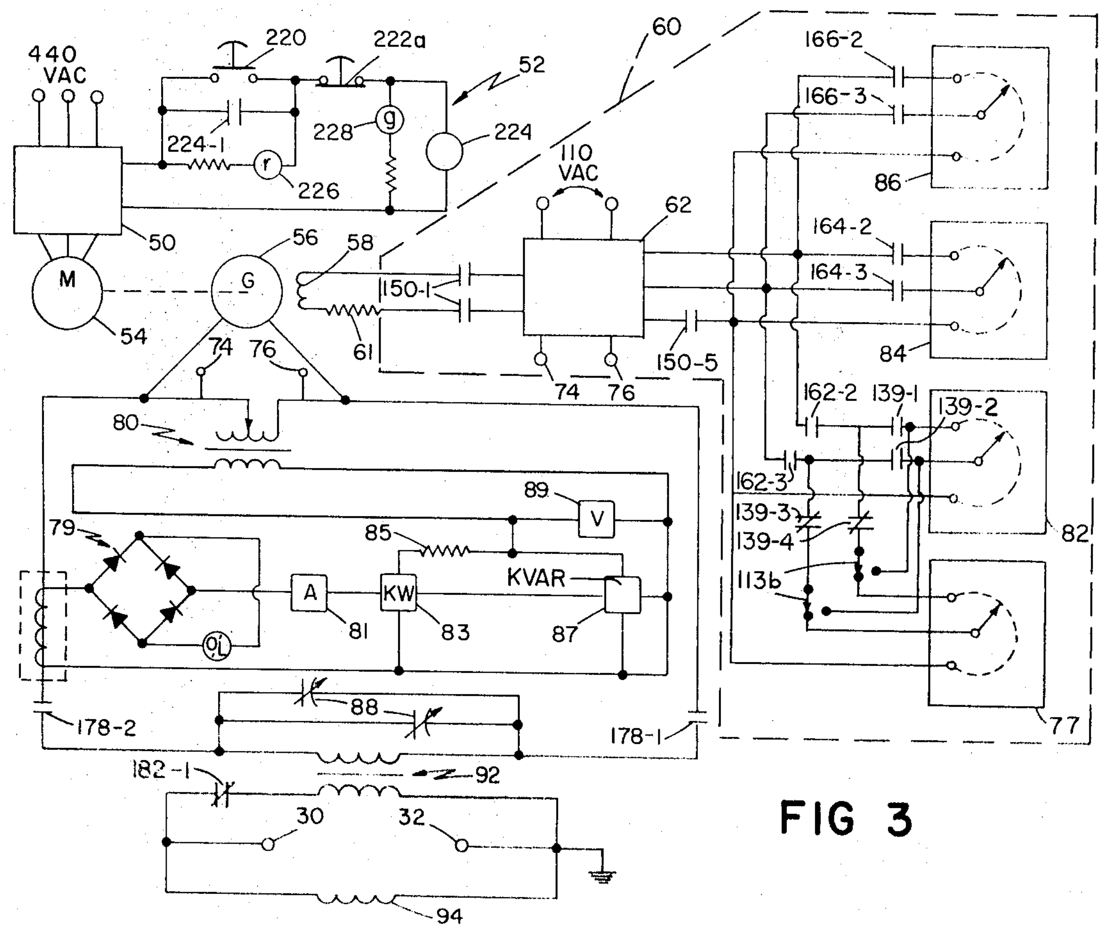
FIG. 3 is a circuit diagram of the generator circuit thereof, including the magnetic welding coil.
Figure 4:
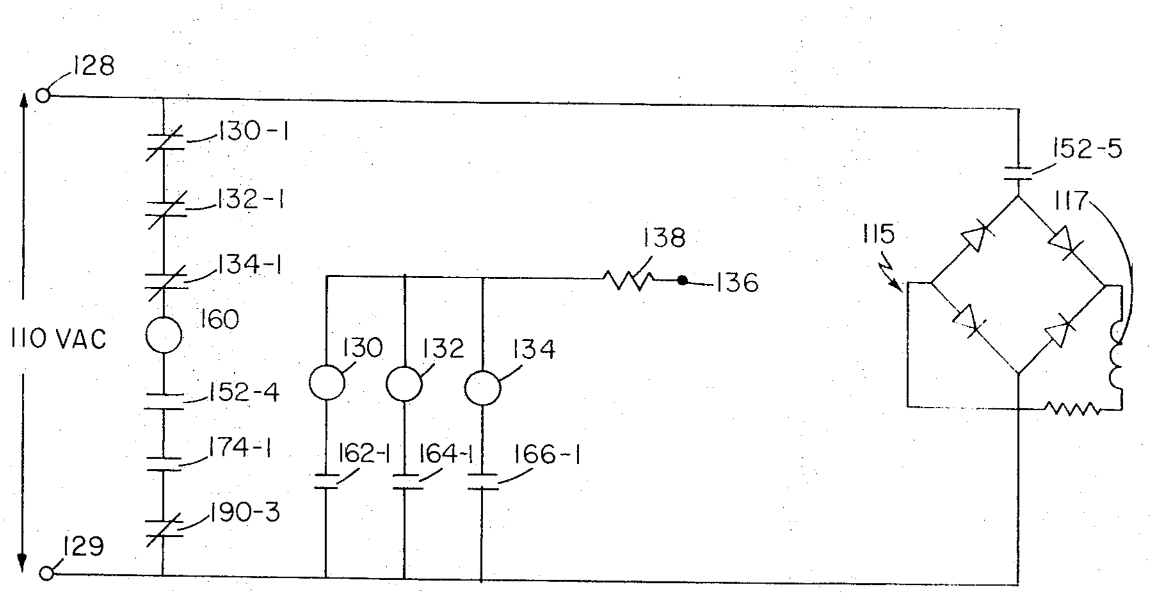
FIG. 4 is a circuit diagram of the capacitor control circuit thereof.

Several coil relays and controlled contacts are shown in the drawings, the normal position of the contacts (whether open or closed) being as shown in the drawings. Field coil relay 150 controls contacts 150–1, -2, -3, -4 and -5. (See FIG. 3 for contacts 150–1 and 150–5). Abort coil relay 152 controls contacts 152–1, -2, -3, -4, -5, -6 and -7. (See FIG. 4 for contacts 152–4 and 152–5). Coil relays 162, 164 and 166 control contacts 162–1, -2 and -3; 164–1, -2, -3 and -4; and 166–1, -2, -3 and -4, respectively. (Contacts 162–1, 164–1, 166–1 are shown in FIG. 4. Contacts 162–2, -3; 164–2, -3; and 166–2, -3 are shown in FIG. 3.) A capacitor discharge counter 172 is parallel to timer 170. Coil relay 174 controls contacts 174–1 (see FIG. 4). Coil relay 176 controls contacts 176–1, 176–2 and 176–3. Heat control relay 178, shown in FIG. 1, controls contacts 178–1 and 178–2 in the motor generator output circuit, shown in FIG. 3. Disconnect control relay 182, shown in FIG. 1, controls contacts 182–1 in the work coil circuit shown in FIG. 3. Disconnect control 182 is also mechanically interconnected with a microswitch 188 so that energization of control 182 results in closing of the microswitch. Pulse coil relay 190 controls contacts 190–1 (see FIG. 2), 190–2, 190–3 (see FIG. 4), and 190–4. Mode coil relays 192, 194 and 196 control contacts 192–1, -2, -3, -4 and -5; 194–1, -2, -3, and -4; and 196–1, -2, -3 and -4, respectively. Latching coil relay 197, latch contacts 198 and unlatching coil relay 199 are also shown. When latching coil relay 197 is energized, latch contacts 198 close. When unlatching coil relay 199 is energized, latch contacts 198 open.

The master control circuit further includes various indicating lights with the necessary associated resistors. They include a "field off" red light 200, a "field on" green light 202, red light 204 indicating the abort switch 112 is in the closed position, a "start" green light 206, and blue mode lights 210, 212 and 214. Also shown are "first charge," "second charge" and "third charge" lights 216, 217 and 218, respectively.

Terminals 230, 231, 232 and 233 are shown in FIG. 1. Each terminal appears twice in the circuit. Terminals with the same number are electrically connected; the connections are not shown for purposes of clarity.

When operated, the apparatus controlled by the circuits can apply inductive heating via work coil 94 and then a magnetic pulse via the same work coil to the object to be welded up to three times in succession. For each subcycle of the operation (one heat and one pressure pulse) the rate of heating, duration of heating and magnitude of the pressure pulse may be varied. During the first subcycle, different rates for first and second portions of the heating phase are possible.

Operation for any mode choice begins by closing main switch 14 (see FIG. 2) which supplies power to terminals 100 and 102 of the control circuit (see FIG. 1) via transformer 16. Step reset switch 122 resets step switch 120 to a position in which contacts 120–1 are closed if it is not already in that position. The closing of contacts 120–1 energizes coil relay 162 which closes contacts 162–1, thereby allowing capacitor bank voltmeter coil 130 to read the voltage across capacitor bank 26, and closes contacts 162–2 and 162–3, putting two terminals of field adjustment rheostat 77 in the circuit of motor-generator voltage regulator circuit 60 (see FIG. 3). Disconnect control relay 182 is energized, and mechanically interlocked microswitch 188 also closes.

If cooling water for the various water cooled parts of the device is connected pressure switch 104 will be closed and if all the doors of the cabinet in which the circuits are housed are shut door switch 106 will be closed.

The motor-generator is next started by pressing pushbutton "on" switch 220 in motor generator start circuit 52 (shown in FIG. 3). Closing switch 220 causes hold coil relay 224 to be energized which closes contacts 224–1. Closed contacts 224–1 keep the start circuit closed when pushbutton switch 220 is released. Red light 226 is deenergized and green light 228 energized.

Pushbutton "field on" switch 108 is pressed, energizing "-field on" green indicator light 202 and also energizing field coil relay 150. Energized field coil relay 150 closes contacts 150–1 (see FIG. 3), connecting motor-generator voltage regulator 60 to field coil 58, closes contacts 150–2 to keep the circuit energized when the "field on" button is released, opens contacts 150–3 to deenergize "field off" red indicator light 200, closes contacts 150–4 to energize abort coil relay 152, and closes contacts 150–5 to put the remaining terminal of field adjustment rheostat 82 in voltage regulator circuit 60.

Abort coil relay 152, energized by the closing of contacts 150–4, opens contacts 152–1, deenergizing red light 204, opens contacts 152–2, deenergizing step reset switch 122, closes contacts 152–3, closes contacts 152–4 and 152–5 in the capacitor control circuit of FIG. 4, closes contacts 152–6 in the circuit of "start" light 206, and closes contacts 152–7. Closing contacts 152–5 energizes coil 117 in vacuum switch driving circuit 115 so that switch 117–1 in the "dump" circuit of capacitor bank charging circuit of FIG. 2 is opened. (If "abort" switch 112 is opened at any time during operation, relay 152 will be deenergized and the contacts associated with it will resume their original positions, energizing red light 204, energizing switch 122 to reset step switch 120, closing the "-dump" circuit in the capacitor-bank-charging circuit to allow any charge accumulated by the capacitor bank to discharge through dump resistor 24, and deenergizing capacitor charge relay coil 160.)

Duration of the first heating step is equal to the sum of the settings in timer unit 140 and capacitor charge timer 170; heat rates for the first heating step are determined for a first portion by setting field adjustment rheostat 77, for a second by setting rheostat 82; the magnitude of the pressure pulse is determined by a setting in voltmeter coil 130 of the desired voltage to be attained by the capacitor bank.

The heat rate for the first portion is set higher than that for the second portion. During the first portion of the heating phase the outside of the material is heated quickly and acts as a heat source for the interior while heat is added at a lower rate during the second portion.

The setting of rheostat 77 is ascertained by reading the output of generator 56 on voltmeter 89 at this time. The setting of rheostat 82 is ascertained by pressing pushbutton switch **113*a* which also closes contacts 113*b* (FIG. 3) and reading voltmeter 89. The setting of rheostat 84 is ascertained by pressing pushbutton switch 116*a* primarily to close contacts 116*b*, and reading the voltmeter. The setting of rheostat 86 is similarly ascertained after pressing pushbutton switch 118*a***.

Capacitor charge timer 170 is set for a time sufficient to allow the capacitor bank 26 to charge to the extent required. It is not necessary to determine the charge time exactly nor to change the setting of timer 170 for each setting of a timer 140, 142 or 144, but the time set for timer 170 must be greater than the possible charge time for any capacitor charge desired. The duration of the first heating step is equal to the time setting of timer unit 140 plus the time setting of capacitor charge timer 170.

If the single mode (one heat and one pressure only) is desired pushbutton **113*a* is pushed. Blue indicating light 210 and mode relay coil 192 are energized. Energization of relay 192 opens contacts 192–1 and 192–2 in the "two mode" and "three mode" button circuits, and opens contacts 192–3, closes contacts 192–4, and opens contacts 192–5 in the circuits of the step switch 120 and step reset switch 122**.

"Start" pushbutton 114 is then closed. Time delay unit 139 is energized. Timer motor unit 140 is energized, closing contacts 140(I)–1 and 140(I)–2. The closing of contacts 140(I)–2 bypasses start switch 114 to keep time delay unit 139 and timer motor unit 140 energized when the pushbutton is released. The closing of contacts 140(I)–1 allows the energization of coil relay 176, and latching coil relay 197.

Energization of latching coil relay 197 causes latch contacts 198 to close. The energization of coil relay 176 opens contacts 176–1 to deenergize "start" light 206, closes contacts 176–2 to energize heat control relay 178, and opens contacts 176–3 to deenergize disconnect control relay 182.

Energization of relay 178 and deenergization of relay 182 closes contacts 178–1 and 178–2 in the output circuit of motor generator 56 (FIG. 3) and closes contacts 182–1 to connect work coil 94 to transformer 92 in the output circuit. A high frequency voltage is transmitted via transformer 92 to the work coil 94. The current in work coil 94 induces a current in whatever conductive material is inserted in the work coil which heats the material in preparation for the magnetic pressure pulse.

The rate of heating is determined by the setting of rheostat 77 in the voltage regulator circuit until time delay unit 139 attains its setting. Then contacts 139–1 and 139–2 are closed and contacts 139–3 and 139–4 are opened, connecting rheostat 82 to the voltage regulator circuit and disconnecting rheostat 77, so that for the second portion of the heating, the rate is determined by rheostat 82.

When the duration of heating reaches the preset level of timer unit 140, heating continues but contacts 140(F)–1 are closed, energizing capacitor charge timer 170, counter 172, and coil relay 174. The energization of coil relay 174 closes contacts 174–1 in the capacitor control circuit of FIG. 4 to energize capacitor charge relay coil 160. "First charge" light 216 is energized.

The energization of capacitor charge relay coil 160 closes contacts 160–1 and 160–2 in the capacitor charge circuit of FIG. 2 to begin the charging of capacitor bank 26.

The capacitor bank charges, the voltage across the capacitors being sensed by voltmeter coil 130. When the voltage reaches the predetermined level voltmeter coil 130 opens contacts 130–1 to deenergize capacitor charge coil 160 and stop further charging.

Capacitor charge timer 170 achieves its preset level after the charging of the capacitor bank. When it does, contacts 170–1 open, deenergizing timer motor unit 140. Deenergization of timer motor unit 140 leads to the deenergization of coil relay 176, capacitor charge timer 170, coil relay 174, and light 216.

Deenergization of coil relays 174 and 176 leads to the energization of "start" light 206, the deenergization of heat control relay 178 and energization of disconnect control relay 182. Contacts 178–1, 178–2, 182–1 open to disconnect work coil 94 from motor-generator 56. Microswitch 188, mechanically interlocked with disconnect control relay 182, is closed, energizing pulse coil relay 190. Pulse coil relay 190, when energized, causes contacts 190–1 in trigger circuit 42 to close, triggering ignitrons 34 to connect the capacitor bank 26 to work coil 94 via terminals 30 and 32, causes contacts 190–2 to close, causes contacts 190–3 in the circuit of coil relay 160 to open, and causes contacts 190–4 to close. The closing of contacts 190–4 causes the energization of unlatching coil relay 199, restoring latch contacts 198 to their open positions deenergizing relay 190. The capacitor bank discharges through the work coil, creating a current pulse which causes magnetic fields to be generated in the work coil and material inserted therein.

The capacitor bank discharge is sensed by voltmeter coil 130 so that contacts 130–1 close. The circuit is now in its original position just prior to pressing "start" button switch 114.

If a heat-pressure-heat-pressure (two mode) operation is desired, "two mode" pushbutton switch **116*a* is pressed. Duration of heating for first and second heats is determined in combination with the setting of timer 170 by manipulation of timer units 140 and 142 respectively, heat rates by rheostats 77, 82 and 84, and pressure magnitudes by voltmeter coils 130 and 132**.

Closing switch **116*a* energizes light 212 and mode coil relay 194, opening contacts 194–1 to deenergize mode coil relay 192 and deenergize light 210, closing contacts 194–2 to keep relay 194 energized when button switch 116 is released, opening contacts 194–3, and closing contacts 194–4 in the step reset switch 122** energization circuit.

Operation of the two mode cycle begins as with the one mode cycle: pressing "start" button switch 114. The sequence of events continues as in the first operation until the point at which pulse coil relay 190 is energized. However, this time contacts 192–3, controlled by first mode coil relay 192 which was deenergized as a result of pushing "two mode" switch 116, are in their normally closed position, so that the closing of contacts 190–2 by the energization of relay 190 causes step switch 120 to be energized via closed contacts 190–2 and 192–3 to open contacts 120–1 and close contacts 120–2. The opening of contacts 120–1 deenergizes coil relay 162. Deenergization of coil relay 162 opens contacts 162–1 to deenergize voltmeter coil 130. The closing of contacts 120–2 energizes timer unit 142 and coil relay 164. The energization of relay 164 leads to the closing of contacts 164–1 to energize voltmeter coil 132 in the capacitor control circuit of Fig. 4 and the closing of contacts 164–2 and 164–3 to put two terminals of field adjustment rheostat 84 in voltage regulator circuit 60. Heating of the work coil and charging and discharging of the capacitor bank then occur, the duration and rate of heating and amount of capacitor discharge being determined by the settings of timer 142 (in combination with timer 170), rheostat 84 and voltmeter coil 132, respectively.

At the end of the second heating and charging cycle the energization of pulse coil relay 190 closes contacts 190–1 to trigger ignitrons 34 and discharge the capacitor bank and closes contacts 190–2. The closing of contacts 190–2 causes energization of step switch 120 to open contacts 120–2 and close contacts 120–3. Step reset switch 122 is then energized via closed contacts 194–4, and unlatching coil relay 199 via contacts 194–4 and closed contacts 192–5, restoring the circuit to the position it had before the "start" button was pushed.

If it is desired to shorten the second heating step before the second pressure step this can be accomplished by setting the timer unit 142 at zero so that as soon as timer unit 142 is energized both contacts 142(I)–1 and 142(F)–1 are closed. The duration of the second heating step will then be determined by capacitor charge timer 170. The rate of heating can be decreased, of course, by adjusting rheostat 84.

When a three mode operation (heat and pressure, three times successively) is desired "three mode" button switch 118*a* is pushed closed. Closing switch 118*a* energizes light 214 and energizes mode coil relay 196 to open contacts 196–1, thereby deenergizing light 210 and mode coil relay 192, open contacts 196–2, close contacts 196–3 to hold relay 196 energized when button switch 118 is released, and close contacts 196–4. Duration of heat, rate of heat and magnitude of pressure pulse for each subcycle may be controlled by settings on timer units 140, 142 and 144, field rheostats 77, 82, 84 and 86, and voltmeter coils 130, 132 and 134.

As in the two mode operation, step switch 120 is energized after the first subcycle of heat and pressure to open contacts 120–1 and close contacts 120–2 while the capacitor bank is discharging. After the second subcycle, step switch 120 is again energized to open contacts 120–2 and close contacts 120–3 to begin a third cycle. Unlatching coil relay 199 is not energized because contacts 194–4 remain open in three mode operation.

During the third subcycle, voltmeter coil 134, timer unit 144 and rheostat 86 are used. At the end of the third subcycle step switch 120 is again energized; this time, however, when contacts 120–3 are opened and contacts 120–4 closed the step reset switch 122 is energized to cause contacts 120–1 to be closed and contacts 120–4 opened. Unlatching coil relay 199 is also energized via closed contacts 192–5.

For welding a socket joint in which two ¾-inch carbon steel pipes were held end to end within a ring formed of a section of 1-inch carbon steel pipe, the 1-inch pipe forming a firm electrical connection with the ¾-inch pipe ends, for example, one subcycle operation has been used. Capacitor charge timer 170 was set for 1 second and timer motor 140 was set for 16 seconds, so that the heating phase was 17 seconds long. Time delay unit 139 was set for 7 seconds and rheostat 77 for 100 percent so that the first portion of the heating phase (high heat rate) lasted 7 seconds; rheostat 82 was set at 30 percent so that the second portion of the heating phase (low heat rate) lasted the remaining 10 seconds.

Other embodiments will occur to those skilled in the art and are within the following claims.

We claim:

1. A system for working conductive solids comprising:
- a work element;
- a capacitor bank providing a working output to said work element during a working phase;
- a capacitor charging circuit for charging said capacitor bank;
- a generator circuit providing a heating output to said work element during a heating phase;
- control circuitry arranged for causing said capacitor bank to provide said working output to said work element subsequent to said heating phase, for causing charging of said capacitor bank through said capacitor-charging circuit prior to said working phase, and for causing said generator circuit to provide said heating output to said work element; and
- said generator circuit providing in one portion of said heating phase one heating output and hence one heating rate, and in another portion of said heating phase another heating output and hence another heating rate.

2. The system of claim 1 in which the first of said heating rates is greater than the second.

3. The system of claim 1 in which said control circuitry includes first and second resistive elements and at least one switch for alternately effectively connecting said resistive elements in said generator circuit to change said output.

4. The system of claim 3 further comprising a timer for actuating said switch.

5. The system of claim 3 wherein each said resistive element is variable.

6. A system for working conductive solids comprising:
- a work element;
- a generator circuit providing a heating output to said work element;
- a capacitor bank providing a working output to said work element and having a charging time interval associated therewith;
- a capacitor charging circuit for charging said capacitor bank; and
- master control circuitry for effectively connecting said generator circuit to said work element at a first time, effectively disconnecting said generator circuit from said work element as a second time, and effectively connecting said capacitor charging circuit to said capacitor bank at a third time intermediate said first and second times, said second and third times differing by not substantially more than said charging time interval.

7. The system of claim 6 further comprising first and second timers:
- said master control circuitry being arranged to actuate said first timer at said first time;
- said first timer being arranged to actuate said second timer at said third time; and
- one of said timers being arranged to cause said capacitor bank to provide said working output to said work element at said second time.

8. The system of claim 7 wherein said control circuitry comprises:
- a first subcycle control circuit including said first timer; and
- a second subcycle control circuit including a third timer.

9. The system of claim 8 wherein said first and second subcycle control circuits share said second timer.

10. The system of claim 6 wherein said control circuitry includes a voltage limiting element operative to effectively disconnect said capacitor charge circuit from said capacitor bank after said third time and upon the charging of said bank to a desired voltage.

11. The system of claim 6 including power supply terminals and wherein said capacitor bank is connected to said work element through a first switch:
- an actuator is provided for said switch, said actuator being connected to one of said power supply terminals through a second switch and to another of said power supply terminals through a third switch;
- said generator circuit is connected to said work element through a fourth switch;
- an actuator is provided for said fourth switch and is connected to one of said power supply terminals through said third switch; and
- said control circuitry being arranged to open said third switch at said first time, to close said second switch no later than said second time, and to close said third switch at said second time.

12. The system of claim 11 further comprising:
- an actuating element for opening said second switch;
- first and second subcycle control circuits, each including a subcycle go switch;

steering circuitry for effectively connecting said actuating element to said power supply terminals; and said steering circuitry comprising first and second branches respectively associated with said first and second subcycle control circuits, each said branch including a switch adapted to be closed by said master control circuitry only if the subcycle go switch associated with the respective branch has been actuated.

13. The system of claim 12 wherein there is provided a third subcycle control circuit, said steering circuitry further comprising a third branch for effectively connecting said last mentioned actuated element to said power supply terminals if neither of said go switches is actuated.

14. The system of claim 13 wherein said second and third branches have in common a normally closed switch which opens upon actuation of said first subcycle go switch.

15. In a system for working conductive solids which comprises:

power supply terminals;

a work element;

a generator circuit for providing a heating output to said work element;

a capacitor bank for providing a working output to said work element upon discharge of said bank;

master control circuitry for selectively causing said heating and working outputs to be provided to said work element during an operating cycle including first, second and third subcycles, said control circuitry comprising:

first, second, and third subcycle control circuits for controlling said respective subcycles;

first, second and third subcycle go switches each actuatable prior to initiation of said first subcycle; and steering circuitry including:

a first branch connected between said terminals, said first branch including in series a normally closed first-relay controlled switch, a normally open second-relay controlled switch, and a step switch having first, second, and third contact sets in said first, second, and third subcycle control circuits respectively, and a fourth contact set, a second branch containing a step reset switch, a third branch containing said fourth contact set, a fourth branch containing a normally open third-relay controlled switch, said second branch being connected at one end to one said terminal and at the other to one end of said third branch, the other end of said third branch being connected to another said terminal, said fourth branch being connected at one end to the junction of said second and third branches and at the other end through said third contact set to said other terminal, said normally closed first-relay controlled switch being opened upon actuation of said first subcycle go switch but not upon actuation of said second or third subcycle go switches, said normally open second-relay controlled switch being closed upon the discharge of the capacitor bank, and said normally open third-relay controlled switch being closed upon actuation of said second subcycle go switch but not upon actuation of said third subcycle go switch.